Nov. 19, 1968
W. H. McLELLAN
3,411,361
SEALED BEAM SENSORS
Filed Oct. 23, 1965
2 Sheets-Sheet 1
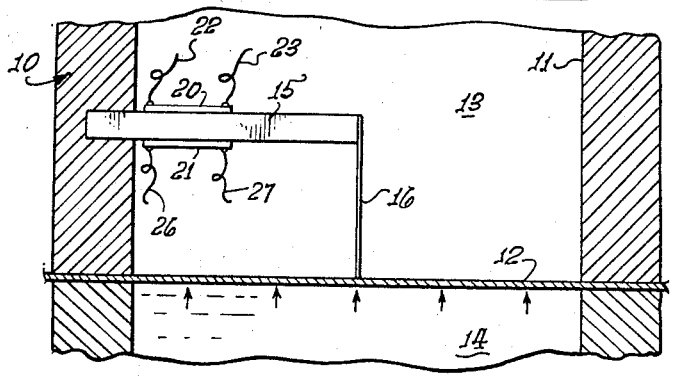
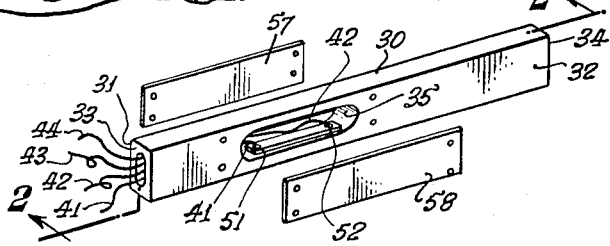
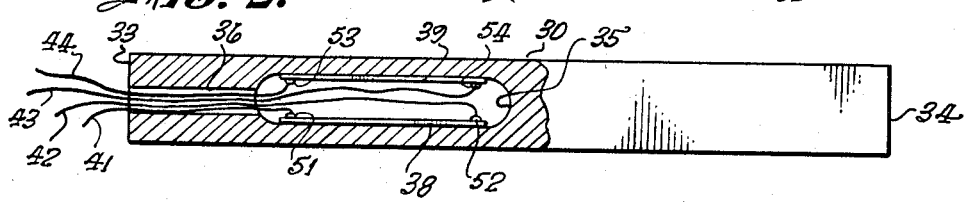
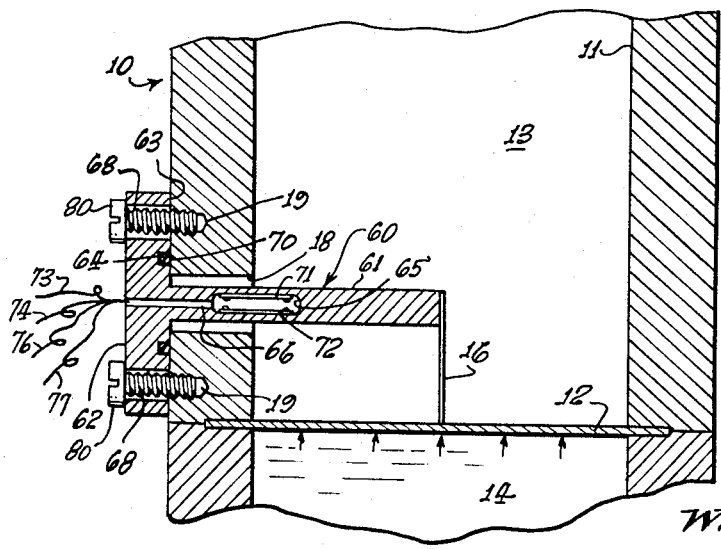
INVENTOR.
WILLIAM H. McLELLAN,
By His Attorneys
Spensley & Horn.

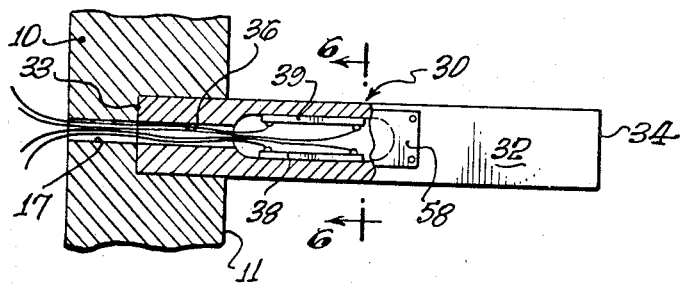
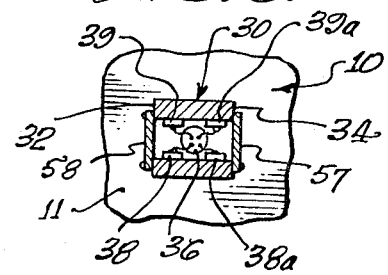
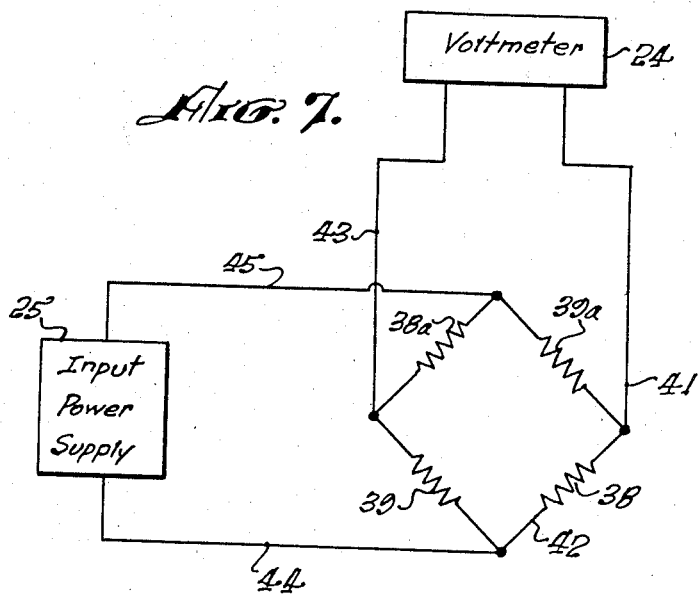

_3,411,361_
SEALED BEAM SENSORS
William H. McLellan, Pasadena, Calif., assignor to Electro-Optical Systems, Inc., Pasadena, Calif., a corporation of California
Filed Oct. 23, 1965, Ser. No. 503,137
10 Claims. (Cl. 73—398)

ABSTRACT OF THE DISCLOSURE

Sealed beam strain sensing apparatus cantilever mounted in the interior volume of a structure and having gages disposed within a transverse slot in the beam. Electrical connecting leads extend from the gages through a longitudinal internal beam passageway in its secured end and a registered pasageway through the structure wall. Cover plates sealing the beam slot and a fluid-tight seal around structure passageway isolates the gages and electrical leads from the structure interior ambient.

Background of the invention

Strain-electric transducers of the type wherein strain gage elements are bonded to a beam which undergoes deflection as a result of applied streess are well known in the art. This type of transducer is particularly useful in pressure-responsive instruments of the diaphragm type, wherein the beam is typically cantilever mounted with its free end secured to a force rod which couples the strain-electric translating element to a diaphragm exposed to the operating fluid.

However, in typical structures of this type the strain gage elements secured to the beam structure are exposed, as are the electrical leads connecting the gage elements with external circuitry, thereby rendering these structures unsuitable for use in differential pressure transducer applications wherein the operating fluid is of a corrosive nature. Also, in most absolute pressure transducer applications it is usually desired that the reference pressure volume be free of wires, bonding cements, etc. The present invention is directed toward a cantilever beam type of strain-electric transducer wherein the gage elements and interconnecting leads are not exposed, thereby obviating the aforementioned undesirable characteristics of present art devices of this type, as well as providing a structure suitable for use in differential pressure transducer applications wherein the beam is exposed to a corrosive operating fluid.

Summary of the invention

The present invention technique comprises utilization of a slotted beam, the slot extending through the thickness of the beam, the gage elements being secured to the beam within the slot with the electrical connecting leads extending through a longitudinal internal passageway in the beam to project from the beam at its secured end. The slot is sealed by thin covers bonded in fluid-tight relationship to the beam surfaces, thereby providing a sealed beam type of sensing unit.

Accordingly, it is an object of the present invention to provide improved pressure-sensitive instruments of the diaphragm type.

It is another object of the present invention to provide improved pressure-responsive transducer structures.

It is also an object of the presnt invention to provide an improved transducer structure of the type utilizing strain gage elements secured to a mechanically deflected beam.

It is a further object of the present invention to provide improved pressure-responsive transducer structures for operation in corrosive fluids.

It is yet another object of the present invention to provide improved differential pressure transducer structures.

It is a still further object of the present invention to provide an improved strain-electric transducer structure of the type utilizing strain gages secured to a beam which is deflected in response to applied stress, wherein the strain gage elements and interconnecting electrical leads are sealed within the beam.

The novel features which are believed to be characteristic of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

Brief description of the drawings

FIGURE 1 is an elevation view, partly in section, of a typical prior art pressure transducer structure;

FIGURE 2 is a cross-sectional view of a present invention gaged beam structure;

FIGURE 3 is an exploded perspective view of the beam structure of FIGURE 2;

FIGURE 4 is a cross-sectional view of a differential pressure transducer embodiment;

FIGURE 5 is a sectional view showing a four gage embodiment of a sensor constructed in accordance with the present invention;

FIGURE 6 is a sectional view taken along line 6—6 of FIGURE 5; and

FIGURE 7 is a circuit diagram of a circuit embodying a sensor system in accordance with the present invention.

Description of the preferred embodiments

Turning now to the drawing, in FIGURE 1 there is shown a typical prior art approach to a pressure transducer of the diaphragm type employing strain gages bonded to a beam which is deflected in response to applied stress. A hollow cylindrical casing 10 has an interior wall surface 11 refining the peripheral boundary of the enclosed volume. A thin diaphragm 12 is sealed in fluid-tight relationship to the casing to divide the interior volume of the casing into two separate chambers, an upper chamber 13 and a lower chamber 14. The upper chamber 13 defines the reference pressure volume for the transducer, while the lower chamber 14 contains the operative fluid, the diaphragm 12 confining the operative fluid to the lower chamber 14.

A cantilever mounted beam 15 is rigidly secured at one of its ends to the casing wall, the free end of the beam being coupled to the diaphragm 12 by means of a force rod 16. Bowing of the diaphragm 12 in response to pressure from the operative fluid will cause deflection of the beam 15. Strain gages 20 and 21 are bonded to the respective upper and lower surfaces of the beam 15 to translate beam deflection into an electrical parameter. The strain gages 20 and 21 are typically piezoresistive elements, such as unitary semiconductor crystal bodies, for example. Stressing of the gage elements causes a change in the electrical resistance of the element. Electrical leads 22 and 23 are secured in ohmic contact with opposite ends of the gage element 20, electrical leads 26 and 27 being secured in ohmic contact to opposite ends of the gage element 21. The gage elements 20 and 21 are bonded on opposite sides of the neutral axis of the beam and are typically wired into a bridge circuit in accordance with well-known practices. The beam 15 can be gaged in different ways, using one or several gage elements, yet the operating principle is the same. The gage elements, the electrical leads, gage bonding cement, etc., are all exposed to the ambient fluid in the upper chamber 13, and it is readily apparent that this type of structure is unsuitable for use where the ambient fluid in the upper chamber 13 is of a corrosive or electroconductive nature.

Referring now to FIGURES 2 and 3 of the drawing there are shown various views of a presently preferred embodiment of a gaged beam structure which obviates the disadvantages of the aforementioned prior art structures. In this embodiment an elongate rectangular beam 30 defines longitudinal side surfaces 31 and 32, and end surfaces 33 and 34. An elongate transverse slot 35 is provided in the beam 30, the slot extending transversely through the beam to form an opening in both the side surfaces 31 and 32. An elongate passageway 36 of circular cross section extends axially through the center of the beam from the end surface 33 to the slot 35. A semiconductor strain gage element 38 is bonded to the lower surface of the slot 35 below the neutral axis of the beam, a similar semiconductor strain gage element 39 being bonded to the upper surface of the slot 35 above the neutral axis of the beam.

One end of a thin wire electrical lead 41 is ohmically bonded to an electrical contact pad 51 metalized on one end of the semiconductor gage element 38, the lead 41 extending through the passageway 36 with the other end of the lead projecting beyond the end surface 33. A similar thin wire electrical lead 42 is ohmically bonded to an electrical contact pad 52 metalized on the other end of the semiconductor gage element 38, the lead 42 also extending through the passageway 36 to project beyond the end surface 33. Electrical connections to the ends of the semiconductor gage element 39 are made in a similar manner, the gage element 39 being provided with metalized contact pads 53 and 54 to which are ohmically bonded the respective ends of a pair of electrical leads 43 and 44, the leads 43 and 44 extending through the passageway 36 and projecting beyond the end surface 33. To assemble this structure the lead wires are ohmically bonded to the gage elements and the free ends of the lead wires are fed through the slot 35 and the passageway 36, whereupon the gage elements are positioned on the beam surfaces inside the slot and bonded into place. Then, a pair of thin rectangular cover plates 57 and 58 are sealed in fluid-tight relationship to the respective side surfaces 31 and 32 of the beam 30 to completely cover the slot.

The preceding described present invention sealed beam sensor may also be gaged with four elements, as indicated in FIGURES 5 and 6, the respective additional upper and lower gage elements being indicated by the reference numerals 39a and 38a. FIGURE 5 also shows the four-gaged beam 30 mounted to the casing 10 of FIGURE 1, it being merely necessary to provide a passageway 17 through the casing wall in registry with the passageway 36 of the beam 30. In the illustrated embodiment the passageway 17 defines a smaller exterior portion of circular cross section of the same diameter as the passageway 36, and a larger interior portion of rectangular cross section receptively engaging the end of beam 30.

The electrical lead wires for connecting the gages with external electrical circuitry are passed through the passageway 36 and 17 and are protected from the ambient fluid in upper chamber 13 by the fluid-tight sealing of the cover plates 57 and 58 to the side surfaces of beam 30, and of the cantilever mounted end of beam 30 to interior wall surface 11 of casing 10.

FIGURE 7 of the drawing shows a typical electrical circuit schematic indicating the connection of the four gages of FIGURES 5 and 6 in a bridge circuit. The electrical leads 41 and 43 are brought out through the passageways 36 and 17 and connected to a voltmeter 24. One output terminal of an input power supply 25 is connected by means of an electrical lead 45 to the joined ends of the gages 38a and 39a, the other output terminal of the power supply being connected to the electrical lead 44. The electrical lead 42 is connected to electrical lead 44 to complete the bridge. The operation of such bridge measuring circuitry is well known in the art and hence need not be discussed in detail beyond stating that flexing of the strain gage in response to stressing of the beam 30 alters the electrical resistance of the gages to provide at the voltmeter 24 a voltage reading indicative of beam deflection.

In a typical example of the beam embodiment shown in FIGURES 5 and 6, the beam was fabricated from 0.035" thick #416 stainless steel, the cover plates being fabricated from 0.001" thick #303 stainless steel shim stock, the cover plates being seam welded to the beam surfaces. A slot of 0.125" length and $\frac{1}{32}$" depth was provided in the beam, the strain gages being silicon semiconductor crystal gages 0.08" in length, the gages having a mean resistance of 5,000 ohms each. Four such gage elements were utilized, two of the elements being bonded to the upper surface of the slot and two of the elements being bonded to the lower surface of the slot, the gage elements being interconnected in a four-active leg bridge circuit in the manner of FIGURE 7. With a 5 volt D.C. input to the bridge circuit an output sensitivity of 100 millivolts per mil of beam deflection was obtained, or one millivolt per gram of applied force.

In FIGURE 4 of the drawing there is shown an application of the present invention sealed beam concept to a pressure transducer of the diaphragm type shown in FIGURE 1. In the FIGURE 4 embodiment a beam structure, generally indicated by the reference numeral 60, defines an elongate rectangular portion 61 and an enlarged transversely extending disc portion 62. The disc portion 62 is provided with a flat mounting surface 63 defining an annular groove 64 which encircles the elongate portion 61. The disc portion 62 is also provided with a plurality of mounting holes 68 arranged in a circular pattern.

The elongate portion 61 of the beam structure 60 is provided with an elongated slot 65 extending through its transverse dimension, and an axially extending central passageway 66 extending from the slot 65 throughout the elongate portion and through the disc portion 62. The elongate portion 61 is of identical construction with the basic sealed beam structure shown in FIGURES 2 and 3, the slot 65 and passageway 66 in the beam structure 60 corresponding to the slot 35 and passageway 36 in the basic beam 30. Semiconductor strain gage elements 71 and 72 are bonded to the respective upper and lower surfaces of the slot 65. A pair of thin wire electrical leads 73 and 74 are bonded in ohmic contact to opposing ends of the gage element 71, and a pair of thin wire electrical leads 76 and 77 are ohmically bonded to opposite ends of the gage element 72, the electrical leads 73, 74, 76 and 77 being threaded through the passageway 66 with their free ends projecting from the disc portion of the beam structure.

FIGURE 4 shows the beam structure 60 used in place of the beam 15 in the apparatus of FIGURE 1, with like reference numerals indicating identical parts throughout. A hole 18 is drilled through the wall of the casing 10, and a series of screw mounting holes 19 are tapped into the outer surface of the casing in a circular pattern, the tapped holes 19 being in register with the mounting holes 68 in the disc portion of the beam structure. An O-ring 70 is fitted into the annular groove 64 in the flat mounting surface 63 of the disc portion and the beam structure 60 mounted to the casing 10 with the elongate portion 61 projecting through the hole 18. The beam structure 60 is secured in position by a series of screws 80 which are inserted through the mounting holes 68 and screwed into the tapped holes 19, tightening of the screws 80 compressing the O-ring 70 and providing a fluid-tight seal.

The free end of the beam structure 60 projecting into the upper chamber 13 is secured to the force rod 16, such as by welding for example. Alternatively, the free end of the elongate portion 61 could be tapered for insertion into a slot in the upper end of the force rod to thereby provide an easily detachable and replaceable assembly. However, this type of mounting could easily distort a thin diaphragm, hence spot welding is presently preferred. A classical X-flexure can be used if necessary to prevent buckling. By selection of the force rod material in accordance with its thermal expansion rate, temperature compensation can be achieved to minimize zero-shift for the transducer elements.

Although not visible in the cross-section view of FIGURE 4, the slot in the beam is sealed by cover plates, as indicated in the beam structure of FIGURE 3, thereby completely eliminating exposure of the strain gage elements, electrical leads, bonding adhesives, etc., to the ambient fluid in the upper chamber 13. Thus, the embodiment of FIGURE 4 can be utilized in applications where the ambient fluid in the upper chamber 13 is of a corrosive or electro-conductive nature, and this embodiment is particularly suitable for differential pressure transducer applications. The casing 10 may be a transducer casing adapted for coupling to a fluid pressurized system or may be a fluid conductor in the system itself, such as a pipe or tube, for example. When using this device in applications where the casing 10 is of circular cross-section, it is merely necessary to provide a flat boss on the exterior of the casing to insure proper alignment with the flat mounting surface 63 of the beam structure. Various other mounting schemes and gage wiring schemes suitable for use with the present invention sealed beam structure will be apparent to those skilled in the art. Hence, although the invention has been described with a certain degree of particularity, it is understood that the present disclosure has been made only by way of example and that numerous changes in the details of construction, the selection of materials, and the combination and arrangement of parts may be resorted to without departing from the spirit and the scope of the invention as hereinafter claimed. For example, the present invention sealed beam structure might be advantageously utilized in any type of transducer in which a beam is deflected in response to an applied stress.

I claim:

1. In a strain-electric transducer:
(a) a supporting structure defining opposing major surfaces with a first passageway extending therebetween;
(b) an elongate beam cantilever mounted to one of the major surfaces of said supporting structure contiguous with said first passageway and forming a fluid-tight seal therearound, said beam defining an axially elongagte slot extending transversely therethrough between openings in its opposite side surfaces intermediate its ends, said beam further defining a second passageway extending axially from said slot through its mounted end in registry with said first passageway, the free end of said beam being adapted for the introduction of a stress to be indicated to deflect the beam in response thereto;
(c) a strain gage element bonded to said beam and completely contained within said slot;
(d) a pair of thin cover plates sealed in fluid-tight relationship to the opposite side surfaces of said beam and completely covering said openings; and,
(e) electrical lead wires coupled to said strain gage element and extending through said first and second passageways for connection to external electrical circuitry.

2. A strain-electric transducer comprising:
(a) a supporting structure defining opposing major surfaces with a first passageway extending therebetween;
(b) an elongate beam cantilever mounted to one of the major surfaces of said supporting structure contiguous with said first passageway and forming a fluid-tight seal therearound, said beam defining an axially elongate slot extending transversely therethrough between openings in its opposite side surfaces intermediate its ends, said beam further defining a second passageway extending axially from said slot through its mounted end in registry with said first passageway and at least partially coextensive therewith;
(c) a strain gage element bonded to said beam and completely contained within said slot;
(d) a pair of thin cover plates sealed in fluid-tight relationship to the opposite side surfaces of said beam and completely covering said openings;
(e) electrical lead wires coupled to said strain gage element and extending through said first and second passageways for connection to external electrical circuitry; and,
(f) means for introducing a stress to be measured to the free end of said beam to deflect said beam in response thereto.

3. A strain-electric transducer comprising:
(a) a supporting structure defining opposing major surfaces with a first passageway extending therebetween;
(b) an elongate beam cantilever mounted to one of the major surfaces of said supporting structure contiguous with said first passageway and forming a fluid-tight seal therearound, said beam defining an axially elongate slot extending transversely therethrough between openings in its opposite side surfaces intermediate its ends, said slot being bounded on its upper side by an upper interior surface of said beam and on its lower side by a lower interior surface of said beam, said upper interior surface being above the neutral axis of said beam, said lower interior surface being below the neutral axis of said beam, said beam further defining a second passageway extending axially from said slot through its mounted end in registry with said first passageway;
(c) a first strain gage element bonded to the upper interior surface of said beam and completely contained within said slot;
(d) a second strain gage element bonded to the lower interior surface of said beam and completely contained within said slot;
(e) a pair of thin cover plates sealed in fluid-tight relationship to the opposite side surfaces of said beam and completely covering said openings;
(f) electrical lead wires coupled to said first and second strain gage elements and extending through said first and second passageways for connection to external electrical circuitry; and,
(g) means for introducing stress to be measured to the free end of said beam to deflect said beam in response thereto.

4. A strain-electric transducer comprising:
(a) a supporting structure defining opposing major surfaces with a first passageway extending therebetween;
(b) an elongate beam cantilever mounted to one of the major surfaces of said supporting srtucture contiguous with said first passageway and forming a fluid-tight seal therearound, said beam defining an axially elongate slot extending transversely therethrough between openings in its opposite side surfaces intermediate its ends, said slot being bounded on its upper side by an upper interior surface of said beam, and on its lower side by a lower interior surface of said beam, said upper interior surface being above the neutral axis of said beam, said lower interior surface being below the neutral axis of said beam, said beam further defining a second passageway extending axially from said slot through its mounted end in registry with said first passageway;
(c) a first elongate piezoresistive strain gage element bonded to the upper interior surface of said beam in axial alignment therewith and completely contained within said slot;
(d) a second elongate piezoresistive strain gage element bonded to the lower interior surface of said beam in axial alignment therewith and completely contained with said slot;
(e) a pair of thin cover plates sealed in fluid-tight relationship to the opposite side surfaces of said beam and completely covering said openings;
(f) electrical lead wires coupled to said first and second strain gage elements and extending through said first and second passageways for connection to external electrical circuitry; and,
(g) means for introducing stress to be measured to the free end of said beam to deflect said beam in response thereto.

5. A strain-electric transducer comprising:
(a) a supporting structure defining opposing major surfaces with a first passageway extending therebetween;
(b) an elongate beam cantilever mounted to one of the major surfaces of said supporting structure contiguous with said first passageway and forming a fluid-tight seal therearound, said beam defining an axially elongate slot extending transversely therethrough between openings in its opposite side surfaces intermediate its ends, said slot being bounded on its upper side by an upper interior surface of said beam and on its lower side by a lower interior surface of said beam, said upper interior surface being above the neutral axis of said beam, said lower interior surface being below the neutral axis of said beam, said beam further defining a second passageway extending axially from said slot through its mounted end in registry with said first passageway;
(c) a first elongate piezoresistive strain gage element bonded to the upper interior surface of said beam in axial alignment therewith and completely contained within said slot;
(d) a second elongate piezoresistive strain gage element bonded to the lower interior surface of said beam in axial alignment therewith and completely contained within said slot;
(e) a plurality of spaced apart electrical contact terminals mounted to an interior surface of said beam and completely contained within said slot;
(f) electrical interconnection means for electrically connecting said strain gage elements to said electrical contact terminals, said electrical interconnection means being completely contained within said slot;
(g) a pair of thin cover plates sealed in fluid-tight relationship to the opposite side surfaces of said beam and completely covering said openings;
(h) electrical lead wires connected to said electrical contact terminals and extending through said first and second passageways for connection to external electrical circuitry; and,
(i) means for introducing a stress to be measured to the free end of said beam to deflect said beam in response thereto.

6. A strain-electric transducer comprising:
(a) a supporting structure defining opposing major surfaces wtih a first passageway extending therebetween;
(b) an elongate beam cantilever mounted to one of the major surfaces of said supporting structure contiguous with said first passageway and forming a fluid-tight seal therearound, said beam defining an axially elongate slot extending transversely therethrough between openings in its opposite side surfaces intermediate its ends, said slot being bounded on its upper side by an upper interior surface of said beam and on its lower side by a lower interior surface of said beam, said upper interior surface being about the neutral axis of said beam, said lower interior surface being below the neutral axis of said beam, said beam further defining a second passageway extending axially from said slot through its mounted end in registry with said first passageway;
(c) first and second elongate piezoresistive strain gage elements bonded in side-by-side relationship to the upper interior surface of said beam in axial alignment therewith and completely contained within said slot;
(d) third and fourth elongate piezoresistive strain gage elements bonded in side-by-side relationship to the lower interior surface of said beam in axial alignment therewith and completely contained within said slot;
(e) a plurality of spaced apart electrical contact terminals mounted to an interior surface of said beam and completely contained within said slot;
(f) electrical interconnection means for electrically connecting said strain gage elements to said electrical contact terminals, said electrical interconnection means being completely contained within said slot;
(g) a pair of thin cover plates sealed in fluid-tight relationship to the opposite side surfaces of said beam and completely covering said openings;
(h) electrical lead wires connected to said electrical contact terminals and extending through said first and second passageways for connection to external electrical circuitry defining a bridge circuit configuration wherein each strain gage element is in a different leg of the bridge; and,
(i) means for introducing a stress to be measured to the free end of said beam to deflect said beam in response thereto.

7. A pressure-responsive transducer comprising:
(a) a hollow body having a diaphragm mounted therein and cooperating with walls thereof to define separate fluid chambers on opposite sides of said diaphragm, whereby said diaphragm is differentially responsive to pressure in said respective chambers, said body further defining a first passageway extending through a wall thereof in one of said fluid chambers;
(b) an elongate beam cantilever mounted to a wall surface of said hollow body contiguous with said first passageway and forming a fluid-tight seal therearound and projecting into said one of said fluid chambers in substantially parallel alignment with said diaphragm, said beam defining an axially elongate slot extending transversely therethrough between openings in its opposite side surfaces intermediate its ends, said beam further defining a second passageway extending axially from said slot through its mounted end in registry with said first passageway;
(c) a strain gage element bonded to said beam and completely contained within said slot;
(d) a pair of thin cover plates sealed in fluid-tight relationship to the opposite side surfaces of said beam and completely covering said opening;
(e) electrical lead wires coupled to said strain gage element and extending through said first and second passageways for connection to external electrical circuitry; and,
(f) a force rod interconnecting the free end of said beam with a central portion of said diaphragm, whereby said beam will be deflected upon movement of said diaphragm in response to pressure changes in said fluid chambers.

8. A pressure-responsive transducer comprising:
(a) a hollow body having a diaphragm mounted therein and cooperating with walls thereof to define separate fluid chambers on opposite sides of said diaphragm, whereby said diaphragm is differentially responsive to pressures in said respective chambers, said body further defining a first passageway extending through a wall thereof in one of said fluid chambers;
(b) an elongate beam cantilever mounted to a wall surface of said hollow body contiguous with said first passageway and forming a fluid-tight seal therearound and projecting into said one of said fluid chambers in substantially parallel alignment with said diaphragm, said beam defining an axially elongate slot extending transversely therethrough between openings in its opposite side surfaces intermediate its ends, said slot being bounded on its upper side by an upper interior surface of said beam and on its lower side by a lower interior surface of said beam, said upper interior surface being above the neutral axis of said beam and in substantially parallel alignment with said diaphragm, said lower interior surface being below the neutral axis of said beam and in substantially parallel alignment with said diaphragm, said beam further defining a second passageway extending axially from said slot through its mounted end in registry with said first passageway and extending at least partially therethrough;
(c) a first elongate piezoresistive strain gage element bonded to the upper interior surface of said beam in axial alignment therewith and completely contained within said slot;
(d) a second elongate piezoresistive strain gage element bonded to the lower interior surface of said beam in axial alignment therewith and completely contained within said slot;
(e) a pair of thin cover plates sealed in fluid-tight relationship to the opposite side surfaces of said beam and completely covering said openings;
(f) electrical lead wires coupled to said strain gage elements and extending through said first and second passageway for connection to external electrical circuitry; and,
(g) a force rod interconnecting the free end of said beam with the central portion of said diaphragm, whereby said beam will be deflected upon movement of said diaphragm in response to pressure changes in said fluid chambers.

9. A pressure-responsive transducer comprising:
(a) a hollow body having a diaphragm mounted therein and cooperating with walls thereof to define separate fluid chambers on opposite sides of said diaphragm, whereby said diaphragm is differentially responsive to pressures in said respective chambers, said body defining a first passageway extending through a wall thereof in one of said fluid chambers;
(b) an elongate beam cantilever mounted to a wall surface of said hollow body contiguous with said first passageway and forming a fluid-tight seal therearound and projecting into said one of said fluid chambers in substantially parallel alignment with said diaphragm, said beam defining an axially elongate slot extending transversely therethrough between openings in its opposite side surfaces intermediate its ends, said slot being bounded on its upper side by an upper interior surface of said beam and on its lower side by a lower interior surface of said beam, said upper interior surface being above the neutral axis of said beam and in substantially parallel alignment with said diaphragm, said lower interior surface being below the neutral axis of said beam and in substantially parallel alignment with said diaphragm, said beam further defining a second passageway extending axially from said slot through its mounted end in registry with said first passageway;
(c) first and second elongate piezoresistive strain gage elements bonded in side-by-side relationship to the upper interior surface of said beam in axial alignment therewith and completely contained within said slot;
(d) third and fourth elongate piezoresistive strain gage elements bonded in side-by-side relationship to the lower interior surface of said beam in axial alignment therewith and completely contained within said slot;
(e) a pair o fthin cover plates sealed in fluid-tight relationship to the opposite side surfaces of said beam and completely covering said openings;
(f) electrical lead wires coupled to said strain gage elements and extending through said first and second passageways for connection to external electrical circuitry defining a bridge circuit configuration wherein each gage element is in a different leg of the bridge; and,
(g) a force rod interconnecting the free end of said beam with the central portion of said diaphragm, whereby said beam will be deflected upon movement of said diaphragm in response to pressure changes in said fluid chambers.

10. A pressure-responsive transducer comprising:
(a) a hollow body having a diaphragm mounted therein and cooperating with walls thereof to define separate fluid chambers on opposite sides of said diaphragm, whereby said diaphragm is differentially responsive to pressures in said respective chambers, said body defining a first passageway extending through a wall thereof in one of said fluid chambers;
(b) an elongate beam cantilever mounted to a wall surface of said hollow body contiguous with said first passageway and forming a fluid-tight seal therearound and projecting into said one of said fluid chambers in substantially parallel alignment with said diaphragm, said beam defining an axially elongate slot extending transversely therethrough between openings in its opposite side surfaces intermediate its ends, said slot being bounded on its upper side by an upper interior surface of said beam and on its lower side by a lower interior surface of said beam, said upper interior surface being above the neutral axis of said beam and in substantially parallel alignment with said diaphragm, said lower interior surface being below the neutral axis of said beam and in substantially parallel alignment with said diaphragm, said beam further defining a second passageway extending axially from said slot through its mounted end in registry with said first passageway;
(c) first and second elongate piezoresistive strain gage elements bonded in side-by side relationship to the upper interior surface of said beam in axial alignment therewith and completely contained within said slot;
(d) third and fourth elongate piezoresistive strain gage etlements bonded in side-by-side relationship to the lower interior surface of said beam in axial alignment therewith and completely contained within said slot;
(e) a plurality of spaced apart electrical contact terminals mounted to an interior surface of said beam and completely contained within said slot;
(f) electrical interconnection means for electrically connecting said strain gage elements to said electrical contact terminals, said electrical interconnection means being completely contained within said slot;
(g) a pair of thin cover plates sealed in fluid-tight relationship to the opposite side surfaces of said beam and completely covering said openings;

(h) elongate electrical lead wires connected to said electrical contact terminals and extending through said first and second passageways for connection to external electrical circuitry defining a bridge circuit configuration wherein each gage element is in a different leg of the bridge; and (i) a force rod interconnecting the free end of said beam with the central portion of said diaphragm, whereby said beam will be deflected upon movement of said diaphragm in response to pressure changes in said fluid chambers.

References Cited

UNITED STATES PATENTS

| | | | |
|---|---|---|---|
| 2,503,304 | 4/1950 | Stainback | 73—88.5 XR |
| 2,597,751 | 5/1952 | Ruge | 73—88.5 XR |
| 3,035,240 | 5/1962 | Starr | 73—88.5 XR |
| 3,147,620 | 9/1964 | Stapler | 73—228 |
| 3,161,844 | 12/1964 | Kabell | 73—88.5 XR |

RICHARD C. QUEISSER, *Primary Examiner.*

C. A. RUEHL, *Assistant Examiner.*